United States Patent [19]

Maltby

[11] 4,128,203

[45] Dec. 5, 1978

[54] FOUR-PORT THERMALLY RESPONSIVE VALVE

[75] Inventor: Edgar W. Maltby, Elgin, Ill.

[73] Assignee: Eaton Corporation, Cleveland, Ohio

[21] Appl. No.: 830,001

[22] Filed: Sep. 1, 1977

[51] Int. Cl.² .......................................... G05D 23/275
[52] U.S. Cl. .............................. 236/100; 123/117 A; 137/80; 251/11
[58] Field of Search ................... 123/97 R, 97 B, 100, 123/117 A; 137/79, 80, 625, 18; 251/11; 236/31.65, 100, 101 A

[56] References Cited

U.S. PATENT DOCUMENTS

| 3,515,368 | 6/1970 | Kelly | 123/117 A |
| 3,738,571 | 6/1973 | Elmer | 236/100 |
| 3,789,811 | 2/1974 | Franz et al. | 123/117 A |
| 3,812,832 | 5/1974 | Scott | 123/117 A |
| 3,887,159 | 6/1975 | Obermaier | 251/11 |
| 3,989,058 | 11/1976 | Jackson et al. | 251/11 X |

FOREIGN PATENT DOCUMENTS 2400450 7/1974 Fed. Rep. of Germany ...... 123/117 A

Primary Examiner—Louis K. Rimrodt
Attorney, Agent, or Firm—R. A. Johnston

[57] ABSTRACT

The invention relates to a four-port thermally responsive valve for valving two pairs of isolated fluid ports in response to predetermined temperatures. A single valve member is movably contained within a housing passageway and spring biased in a first position so that sealing surfaces at either end of the valve member are respectively engageable with and spaced from corresponding seating surfaces in the passageway for achieving initially open or closed valved conditions within each pair of fluid ports. A seal ring mounted in the passageway and surrounding the valve member isolates the first pair of fluid ports from the second pair of fluid ports thereby preventing fluid interaction therebetween. When predetermined temperatures are encountered, a thermally responsive actuator connected to the valve member by a rod overcomes the biasing force generated by the spring and moves the valve member to a position that simultaneously reverses the valved condition of each pair of fluid ports.

11 Claims, 5 Drawing Figures

FOUR-PORT THERMALLY RESPONSIVE VALVE

BACKGROUND OF THE INVENTION

Valves for switching between a plurality of vacuum or pressure lines are finding increasing use in today's automobile and truck engines due in part to the need for controlling a proliferating array of accessory equipment relating to fuel economy and emission control, for example, exhaust gas recirculators and evaporator canisters. Prior art devices have often been characterized by the use of slider or lip seals passing over the edge of an orifice. Valve life for this type of device has been shortened by excessive wear of the seal members. Other multiport prior art valves have utilized separate fluid chambers in cooperation with complicated and expensive flexible diaphragms. A further problem associated with prior art devices is that of available space around the engine block. This is particularly a problem with valves which are actuated by a thermal sensor, where it has been necessary to provide each valve with a separate threaded access hole in the engine block for connections thereto as, for example, to the engine cooling system. A further disadvantage associated with prior art devices is that heretofore each valve required its own thermally responsive actuator, thus requiring a plurality of element in the valve which has inherently the greatest manufacturing cost.

SUMMARY OF THE INVENTION

The present invention offers several unique features which overcome the problem encountered with prior art devices by combining several valving functions into one device and at reduced costs. A single internal valve member is received in a passageway in a valve housing and is movable between a first and second position for alternately opening and closing two pair of fluid ports. Each pair of fluid ports is valved simultaneously by the movable valve member which is actuated by a single thermally responsive actuator acting through a single rod. Costly diaphragms are not used in the device but rather a plurality of seal rings positively engage and disengage respective corresponding valve seats for achieving the sealing and valving functions. A seal ring centrally located in the fluid passageway defined by the valve housing isolates a first pair of fluid ports from a second pair of fluid ports. The device of the present invention is made compact by combining two valving functions into one device and employing a single thermally responsive actuator in performing two valving functions. Furthermore, by combining two valve functions into one device, further unit cost savings are realized. In addition, the present invention achieves the above-mentioned advances over the prior art without the use of exotic materials and/or manufacturing techniques.

DETAILED DESCRIPTION

Figure 1:
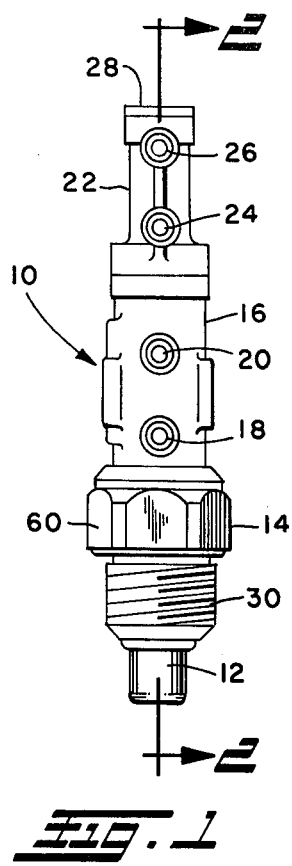
FIG. 1 is a plan view of the assembly of the device of the present invention.

Referring to FIG. 1 a first embodiment of the thermally responsive vacuum valve 10 is shown having a thermally responsive actuator 12 extending from an adapter 14. A lower housing section 16 is provided which includes first and second spaced fluid ports 18 and 20 preferably vertically aligned. An upper housing section 22 is provided and has formed therein third and fourth spaced fluid ports 24 and 26 which are also preferably aligned. A separate cover 28 forms the top surface of the upper housing 22. The cover 28, upper housing 22, and lower housing 16 are preferably injection molded from a suitable plastic material, in the presently preferred practice a glass filled nylon, and joined together and sealed by any suitable means as, for example, a sonic welding process. The housing sections are free to rotate with respect to the adapter 14 permitting alignment of the fluid ports after installation to any desired position. An adapter 14 is attached to the bottom end of lower housing 22 and has a pipe thread 30 at one end which permits assembly of the valve to the apparatus from which a medium is to be sensed as, for example, a location on an engine suitable for sensing the temperature of the engine coolant operating conditions.

Figure 2:
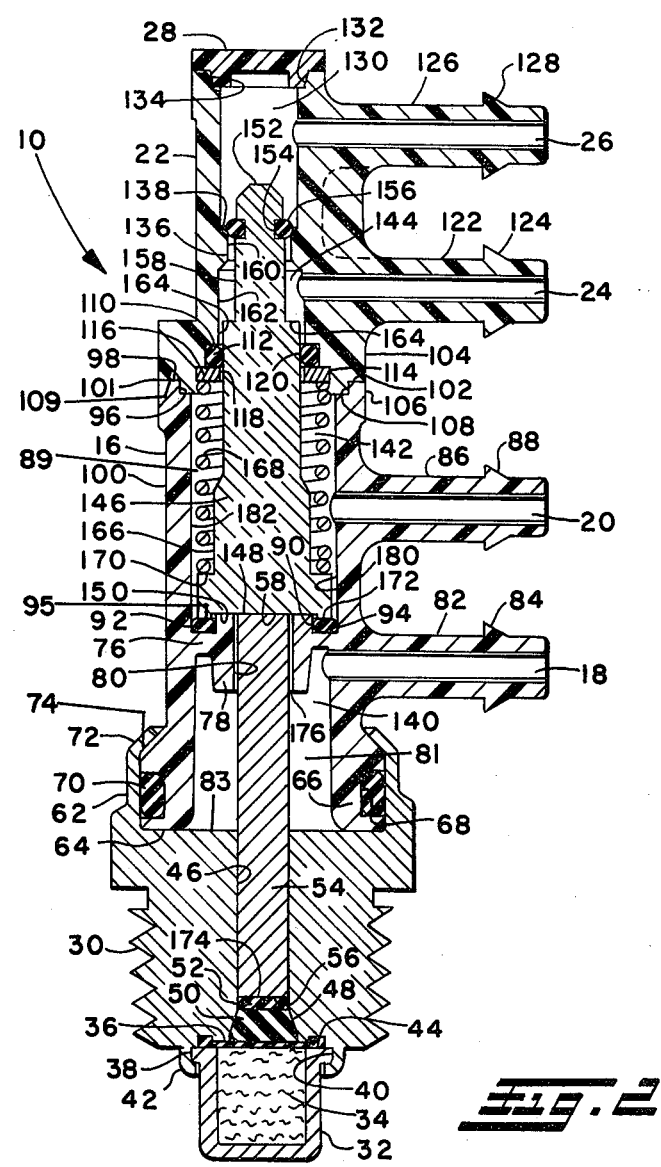
FIG. 2 is a cross-sectional view of the embodiment of FIG. 1 taken along section indicating lines 2 — 2 of FIG. 1 and illustrates the valve in a first position with both pair of fluid ports normally closed when the thermal element senses temperatures below a predetermined level.

Referring now to FIG. 2, a volumetrically thermally responsive material 34 which may be of any suitable type well known in the art, is disposed within a retaining cup 32 attached to the lower extremity of adapter 14 and formed from mild steel filled with a mixture 34 of wax and metallic flakes. The mixture is enclosed in the cup by a flexible cover in the form of a resilient, preferably elastomeric diaphragm 36. A preferred mixture is that of wax and copper metallic flakes which has an abrupt volumetric change across a narrow temperature band of approximately 7 to 10 degrees Fahrenheit. The volume increase of the mixture while passing through this temperature range is sufficient to result in a linear translation of the retaining diaphragm 36 of approximately 0.070–0.080 inch. Prior to and after passing through this temperature band, the resultant linear translation of the mixture is only 0.0003 inch per ° F., an amount insufficient to effect the performance of the valve. The wax and copper flake mixture is formulated to provide a volumetric increase in excess of that initially required to actuate the valve in order to compensate for subsequent deterioration of the wax which leads to reduced volumetric expansion over extended periods of time and exposure to high temperatures. A thin wall annular portion 38 formed on the bottom of adapter 14 is deformed over and around a flange provided on the periphery of the retaining cup 32. The retaining cup 32 is preferably held in place by crimping the portion 38 around the flanged end of the retaining cup. The retaining disphragm 36 is sealed against the top surface 44 of the retaining cup and the end of the adapter, thus confining the wax mixture 34 therein. The adapter 14 may be fabricated from steel or other suitable material as, for example, brass and has a centrally located bore 46 located therethrough and a tapered counterbore 48 located at the thermal actuator or upper end of the adapter. A plug 50 which conforms generally to the space defined by the tapered counterbore 48 is received therein. A spacer 52 which is disc-shaped with a thickness substantially less than its diameter is received in bore 46 and registers against the upper surface of plug 50 and has a diametral clearance with respect to bore 46 for sliding movement therein. The diaphragm 36, plug 50, and spacer 52 are all formed from a rubber compound which is compatible with the wax-metal flake mixture and suitable for service exposure to the temperatures encountered during operating conditions. A rod 54, preferably fabricated from aluminum, is located within bore 46 with one end thereof 56 in contact with spacer 52 and the other end 58 extending into upwardly lower housing section 22. In operation, the expansion of the mixture 34 is transferred through diaphragm 36, plug 50, and spacer 52 to rod 54 causing upward movement thereof for moving valve member 146 upwardly to a second valving position. This function will be described subsequently in greater detail. As best shown in FIG. 1, the exterior surface of adapter 14 is provided with a hexagonal pattern of wrench flats typically indicated by surface 60 to facilitate installation of the valve. The portion of the adapter 14 below the wrench flats is threaded for attachment to a suitable connector. Referring to FIG. 2, the relatively thin wall cylindrical projection 62 is formed in the upper end of the adapter 14 and has located and received therein the lower housing section 16. The bottom end 64 of lower housing section 16 has a thickened cylindrical wall portion 66 with an annular groove 68 molded therein in which is received a seal ring 70. Seal ring 70 provides a dynamic seal between the adapter 14 and lower housing section 16. An upper portion 72 of cylindrical projection 62 has a wall thickness suitable for crimping against a tapered surface 74 of lower housing section 16. Upper portion 72 is crimped over surface 74 with a force sufficient to locate and retain the lower housing in the adapter, but allow relative rotation therebetween at a breakaway torque from about 10 to 30 inch - pounds, but generally not exceeding 50 inch - pounds in the preferred form.

Located within housing section 16 is a transverse wall section 76 ending in a centrally located cylindrical portion 78 defining a bore 80. Rod 54 extends through bore 80, the clearance between rod 54 and bore 80 being sufficient to permit free fluid flow therethrough, as is subsequently described in more detail. A fluid chamber 81 is formed by lower housing section 16, wall portion 76, and the top surface 83 of adapter 14. A tubular projection 82 formed integrally with and extends perpendicularly from housing section 16 and has fluid port 18 formed therein. Fluid port 18 communicates with fluid chamber 81. A flared nipple 84 is formed near the end of fluid port 18 for sealingly attaching vacuum or similar pneumatic hose. In a similar fashion another tubular projection 86 spaced from projection 82 is formed integrally with the lower housing and has the second fluid port 20 formed therein with a flared nipple 88 molded thereon. Second fluid port 20 enters a fluid chamber 89 formed by housing section 16 at a point above wall section 76 with respect to FIG. 2. An annular groove 95 is defined by outer surface 90 of cylindrical portion 78 and internal surface 92 of housing section 16 and has received therein a first seal ring 94, the upper surface of which in FIG. 2 forms a first valve seat. A registering counterbore 96 is provided in the upper end of housing section 16. Referring to FIG. 2, the upper portion of the lower housing section 16 has a flange 98 formed thereon and of diameter slightly larger than the main diameter 100 of the housing section 16 for providing sufficient structure for a junction at parting line 101 of upper and lower housing sections. A registering diameter 108 extends from the bottom face 109 of the upper housing 22 and fits into registering counterbore 96 formed in the lower housing 16. This junction is later joined by a suitable technique, such as sonic welding together. Mounted against a shoulder 110 in the lower end of upper housing section 22 is a seal ring 112 whose function will be subsequently described. Adjacent shoulder 110 is provided another shoulder 114. A washer 116 seats against shoulder 114 and also bears against the seal ring 112. The internal diameter 118 of the washer is greater than the effective internal seal diameter 120 of seal ring 112. A third tubular projection 122 with a flared nipple 124 is formed on upper housing section 22 and has third fluid port 24 formed therein which fluidly communicates with a fluid chamber portion 125 formed by upper housing section 22. In the preferred practice, third fluid port 24 enters the upper housing section 22 at a point above seal ring 112. A fourth tubular projection 126 with a flared nipple 128 is spaced above third projection 122 and fluidly communicates with a fluid chamber portion 130 formed by housing section 22. The cover 28 closes the fluid passageway 130 defined by upper housing 16. A locating or registering diameter 132 on the under side of the cover is received in a locating counterbore 134 in the upper housing and is joined and sealed thereto by any suitable expedient, such as a sonic welding process.

Located intermediate third fluid port 24 and fourth fluid port 26 and within fluid chamber 130 is an annular shoulder 136 having a chamfered or tapered face 138, designated as a second valve seat. In the presently preferred practice the upper and lower housing are formed by a suitable plastic injection molding process. However, other materials and manufacturing techniques may be used to fabricate the housing members. Having now described the configuration of the upper and lower housing members it can be seen that the fluid ports each communicate with a corresponding fluid passageway defined by the upper and lower housing sections. More particularly referring to FIG. 2, first fluid port 18 communicates with fluid chamber portion 81, second fluid port 20 communicates with fluid chamber portion 89, third fluid port 24 communicates with fluid chamber portion 125 and fourth fluid port 26 communicates with fluid chamber portion 130. Interaction of the fluid chamber portions with the respective fluid ports will be subsequently described.

As best shown in FIG. 1, all four fluid ports are disposed in common alignment along the upper and lower housing sections. The sonically welded joints herein described must form fluid sealing connections.

As shown in FIG. 2, located within the upper and lower housing sections is a valve member 146 fabricated from a suitable material, preferably aluminum or plastic and having the lower end 148 seating against the upper face 150 of cylindrical portion 78 and having the upper end 152 extending into fluid chamber portion 130. An annular groove 154 formed near the upper end of the valve member contains a seal ring 156. The lower portion of outer diameter 158 of seal ring 156 is engageable with tapered surface 138, designated as a second valve seat to provide a seal therebetween. Ample radial clearance between upper diameter 158 of the valve member and the internal diameter 160 of shoulder 136 is provided to permit movement and fluid flow therethrough.

The valve member 146 has an intermediate diameter 164 which fits within a bore 162 formed in the upper housing section 22 and diameter 164 sealingly engages with the inner periphery of seal ring 112. Received over diameter 166 of the valve member and guided thereon is a biasing means in the form of a compression spring 168 preferably wound from a chrome-silicon alloy steel, and having one end reacting against washer 116 with the other end thereof reacting against shoulder surface 170 of the valve member for maintaining the end 148 of the valve member in contact with surface 150 in the housing. An annular rim portion 172 projects beyond the end 148 of valve member 146 and is designated as a first seal means and sealingly engages with seal ring 94 when valve member 146 is in the first position as shown in FIG. 2. The annular rim portion 172 of valve member 146 extends a sufficient amount axially beyond the rod end 148 so that seal ring 94 has sufficient compression to achieve proper sealing. Sufficient force is generated by compression spring 168 to maintain valve member 146 in sealing contact with seal rings 94 and 156. Seal rings 70, 94, 112, and 156 are preferably an elastomeric material capable of withstanding continuous exposure to temperatures of 400° to 500° Fahrenheit without degradation.

As shown in FIG. 2, valve member 146 is biased by spring 168 to the first position, at sensed temperatures less than a predetermined minimum, the annular rim portion 172, designated as a first seal means, is in sealing contact with seal ring 94, designated as a first valve seat. When valve member 146 is in the first position, fluid communication is blocked between the first and second fluid ports. In this position, as shown in FIG. 2, seal ring 156, also designated as a second seal means, is in sealing contact with tapered surface 138, also designated as a second valve seat, thereby also blocking fluid communication between the third and fourth fluid ports. Seal ring 112, retained in place by washer 116 and compression spring 168, and also designated as an isolating means, serves to isolate fluid chamber portion 125 from fluid chamber portion 89 thereby continuously isolating fluid ports 18 and 20 from fluid ports 24 and 26. The compression spring 168 maintains the valve member and respectively the corresponding first and second seal means and valve seats in engagement as shown in FIG. 2. While the device is in the above-described first position, the thermally responsive actuator 12 is disengaged, since the temperatures sensed are below those necessary to cause an abrupt volumetric increase in the wax and metal flake mixture.

It will be understood, however, that rod 54 spans the distance from the bottom surface 148 of the valve member to the top surface 174 of spacer 52 without deflecting retaining diaphragm 36 or allowing excessive clearance, which would permit expansion of mixture 34 without translation of rod 54.

Figure 3:
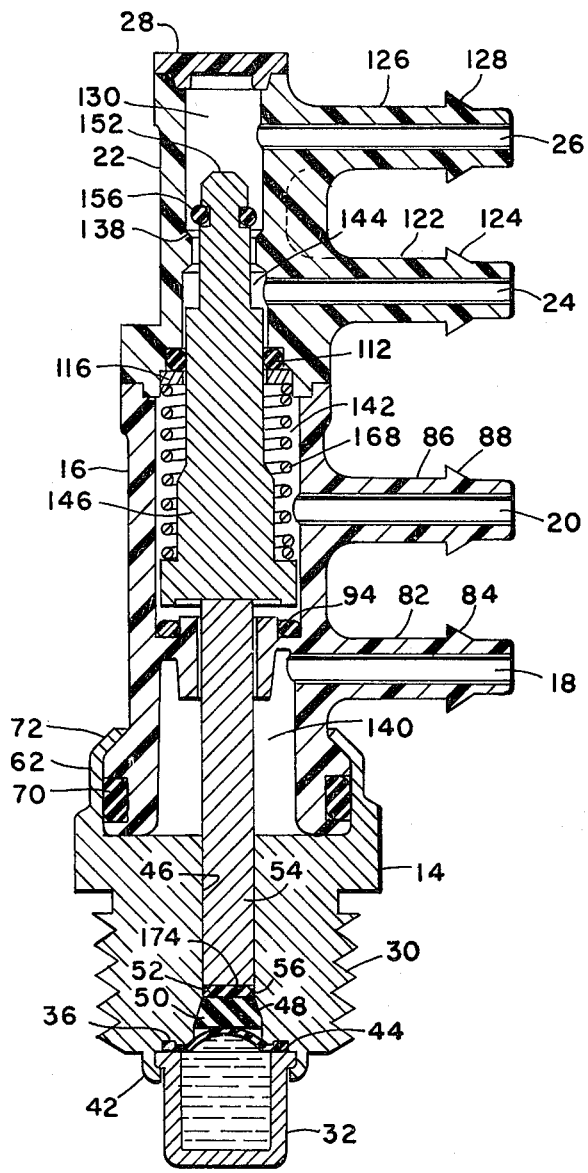
FIG. 3 is a cross-sectional view similar to FIG. 2 illustrating the valve in a second position wherein both pair of fluid ports are open with the thermal element sensing temperatures at or above a predetermined level.

Referring now to FIG. 3, the valve is shown in a second position wherein the thermally responsive actuator 12 is sensing temperatures above the value which results in a corresponding abrupt volumetric increase of the wax and copper flake mixture 34. As shown in FIG. 3, the expansion of mixture 34 has overcome the biasing force of spring 168 and has moved rod 54 and valve member 146 upward to the second position. In the second position, valve 146 has disengaged both the first seal means 172 from the first valve seat 94, and the second seal means 156 from corresponding second valve seat 138. In the second valve position, fluid communication is provided between first fluid port 18, second fluid port 20, and by a path through fluid chamber portion 81, around clearance 176 between rod 54 and bore 80, across the gap between seal ring 94 and annular rim portion 172, through the clearance defined by valve diameter 180 and lower housing bore surface 182, into fluid chamber portion 89, and then into second fluid port 20. In a similar fashion, fluid communication is provided between third fluid port 24 and fourth fluid port 26, by a path through fluid chamber portion 125, across the gap formed by seal ring 156 and tapered surface 138, into fluid chamber portion 130, and then into fourth fluid port 18. If temperatures below a predetermined value are encountered, the volume of the wax and copper flake mixture will abruptly decrease, thereby lowering rod 54 and allowing the biasing force of spring 168 to return the valve member 146 to its first position.

Figure 4:
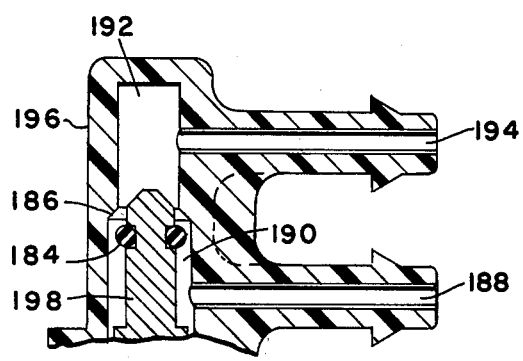
FIG. 4 is a partial cross-sectional view illustrating a second embodiment of the invention in a first position wherein the top pair of fluid ports are normally open when the thermal element senses temperatures below a predetermined level.

Referring now to FIG. 4, there is shown a partial cross-sectional view of the second embodiment of the invention with the valve member 198 thereof in the first position in which fluid communication is provided between the third and fourth ports 188, 194. The first and second fluid ports, not shown in FIG. 4, have fluid communication therebetween blocked as shown in FIG. 2. It will be understood that the remaining structure and position of the second embodiment in the first position is identical to that shown in FIG. 2. In the embodiment of FIG. 4, seal ring 184 is spaced away from the second valve seat comprising tapered surface 186, thus communicating third fluid port 188 and fluid chamber portion 190 with fluid chamber portion 192 and fourth fluid port 194. The upper housing member 196 of the embodiment of FIG. 4 is a single molded piece rather than a separate cover 28 as shown in FIG. 2 of embodiment one.

Figure 5:
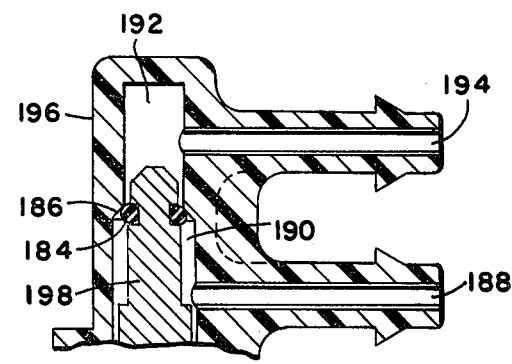
FIG. 5 is a partial cross-sectional view similar to FIG. 4 illustrating the second embodiment of the invention in a second position wherein the top pair of ports are closed with the thermal element sensing temperatures at or above a predetermined level.

FIG. 5 shows the valve member 198 moved to the second position by the thermally responsive actuator in response to temperatures above the predetermined range required for abrupt volumetric expansion wherein seal ring 184 is sealingly engaged with tapered valve seat 186. In the second position, shown in FIG. 5, third fluid port 188 and fluid chamber 190 are blocked with respect to fluid communication with chamber portion 192 and fourth fluid port 194. The interaction and configuration of the remaining valve components not shown in FIG. 5 are identical in structure and position to that shown in FIG. 3.

The present invention thus provides a device capable of receiving a pair of vacuum or pressure signals from various engine sources and simultaneously valving same to other locations in response to predetermined engine temperatures by means of a single valve member and a single thermally responsive actuator. The present invention employs a unique centrally located seal ring which effectively isolates the first and second fluid ports from the third and fourth fluid ports.

Modifications and variations of the preferred forms of the invention will be apparent to those having ordinary skill in the art without departing from the teachings as herein above-described, and the invention is limited only by the following claims.

What is claimed is:

1. A thermally responsive device for valving two pairs of fluid ports, comprising:
   (a) a housing means defining a fluid chamber, said housing means further defining first, second, third and fourth fluid ports communicating with said fluid chamber;
   (b) valve means disposed within said fluid chamber, said valve means including:
      (i) means defining a first valve seat in said housing means and located intermediate said first and second fluid ports, said first valve seat is defined by an annular surface of said housing means and disposed within said fluid chamber;
      (ii) means defining a second valve seat in said housing means and located intermediate said third and fourth fluid ports;
      (iii) a valve member disposed within said fluid chamber, said valve member being movable between a first and second position and having first and second spaced seal means thereon, said first seal means comprising a resilient annular member mounted on said valve member and movable therewith, in which first position said first seal means seals against said first valve seat for isolating said first and second fluid ports from each other, and in which second position said first seal means is spaced from said first valve seat for communicating said first fluid port with said second fluid port wherein, upon movement of said valve member between said first and second positions, said second seal means is moved between a position sealing against and a position spaced from said second valve seat;
   (c) means disposed within said fluid chamber and cooperating with said valve member for isolating said first and second fluid ports from said third and fourth fluid ports, irrespective of the position of said valve member;
   (d) means biasing said valve member to said first position; and
   (e) thermally responsive means associated with said housing means and including means operative to move said valve member between said first and said second positions in response to predetermined temperatures.

2. The device defined in claim 1, wherein, upon said valve member being in said first position, said second seal means seals against said second valve seat for isolating said third and fourth fluid ports from each other, and wherein, upon said valve member being in said second position, said second seal means is spaced from sealing engagement with said second valve seat.

3. The device defined in claim 1 wherein, upon said valve member being in said first position, said second seal means is spaced from sealing engagement with said second valve seat, and, upon said valve member being in said second position, said second seal means seals against said second valve seat for isolating said third and fourth fluid ports from each other.

4. The device as defined in claim 1, wherein said isolating means, said first valve seat, and said second seal means are formed from an elastomeric material.

5. The device as defined in claim 1, wherein said housing means includes a lower housing member having said first and second fluid ports spaced thereon and an upper housing member having said third and fourth fluid ports spaced thereon, said upper and lower housing members being joined in a fluid sealing arrangement along a parting line.

6. The device as defined in claim 5, wherein said upper and lower housing members are formed from a plastic material.

7. The device as defined in claim 6, wherein said upper and lower housing members are sonically welded together at said parting line.

8. The device described in claim 1, wherein said first, second, third and fourth fluid ports are disposed in a common alignment.

9. A thermally responsive device for valving two pairs of fluid ports, comprising:
   (a) a housing means defining a fluid chamber, said housing means further defining first, second, third and fourth fluid ports communicating with said fluid chamber;
   (b) valve means disposed within said fluid chamber, said valve means including:
      (i) means defining a first valve seat in said housing means and located intermediate said first and second fluid ports, said first valve seat is defined by an annular surface of said housing means and disposed within said fluid chamber;
      (ii) means defining a second valve seat in said housing means and located intermediate said third and fourth fluid ports;
      (iii) a valve member disposed within said fluid chamber, said valve member being movable between a first and second position and having first and second spaced seal means thereon, said first seal means comprising a resilient annular member mounted on said valve member and movable therewith, in which first position said first seal means seals against said first valve seat for isolating said first and second fluid ports from each other, and in which second position said first seal means is spaced from said first valve seat for communicating said first fluid port with said second fluid port, wherein, upon movement of said valve member between said first and second positions, said second seal means is moved between a position sealing against and a position spaced from said second valve seat;
   (c) means disposed within said fluid chamber for isolating said first and second fluid ports from said third and fourth fluid ports, irrespective of the position of said valve member;
   (d) means biasing said valve member to said first position, said biasing means being effective for retaining said isolating means within said fluid chamber upon movement of said valve member; and
   (e) thermally responsive means associated with said housing means and including means operative to move said valve member between said first and said second positions in response to predetermined temperatures.

10. The device as defined in claim 9 wherein said biasing means includes a spring reacting against said isolating means.

11. The device as defined in claim 1, wherein,
   (a) said housing means includes an annular shoulder formed in the inner periphery of said fluid chamber intermediate said second and third fluid ports;
   (b) said isolating means includes a seal ring sealingly contacting the internal surface of said fluid chamber and the outer periphery of said valve member, said seal ring being registered against said shoulder; and
   (c) washer means having said valve member received therethrough and contacting said seal ring with said biasing means reacting thereagainst for retaining said seal ring against said shoulder.

* * * * *